(No Model.)
G. WILLIAMS & A. A. CLEVELAND.
POUND NET.
No. 481,990. Patented Sept. 6, 1892.
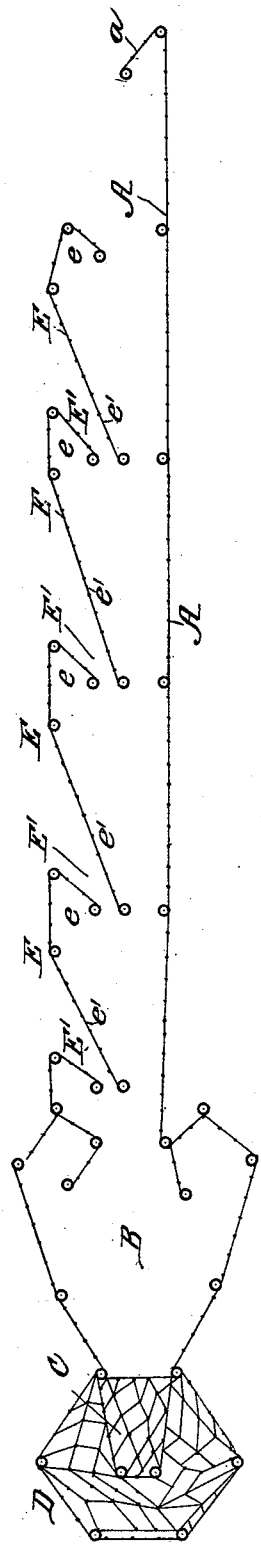
WITNESSES:
Fred G. Dieterich
P. B. Turpin.
INVENTORS
George Williams,
A. A. Cleveland.
BY
Munn & Co.
ATTORNEYS

UNITED STATES PATENT OFFICE.

GEORGE WILLIAMS AND ALBERT A. CLEVELAND, OF ASTORIA, OREGON.

POUND-NET.

SPECIFICATION forming part of Letters Patent No. 481,990, dated September 6, 1892.

Application filed November 5, 1891. Serial No. 411,011. (No model.)

*To all whom it may concern:*

Be it known that we, GEORGE WILLIAMS and ALBERT A. CLEVELAND, of Astoria, in the county of Clatsop and State of Oregon, have invented a new and useful Improvement in Pound-Nets, of which the following is a specification.

This invention is an improvement in pound-nets, and has for an object to provide a simple novel construction of parts whereby the fish meeting the lead of the net will be prevented from drifting back too far away from the said lead and their entrance into the heart and pound of the net will be insured.

The invention consists in certain features of construction and novel combinations of parts, as will be hereinafter described, and pointed out in the claim.

In the drawing the figure is a plan view of the improved net.

The lead proper A, heart B, tunnel C, and pot D may be of ordinary well-known construction. The lead, as is well known, is made of spiles covered with net, its object being to lead the fish into the heart, whence they pass through the tunnel into the pot.

In practice it is found that the fish often come to the lead and pass outside the heart and are lost at least to that particular net, and to avoid this loss of the fish after they have come to the lead is the object sought by our improvements.

It is recognized that fish go against the current, and often on meeting an obstruction they will follow it a short distance and not finding an opening will drift back with the current and consequently in the ordinary net with the lead unguarded they are likely to drift so far back as to pass outside of the heart and escape the trap. To avoid this difficulty we provide what may be termed "guards" E, arranged in a series alongside of and a short distance from the lead, such guards being in the nature of short lengths of net and spiles arranged, preferably, in hook shape with the end of each guard-section E lapped slightly past the adjacent end of the next section, as shown in the drawing.

In specifically describing the guards as shown and preferred, we would state that they are formed at their rear ends or ends opposite or farthest from the heart and pot with hooks *e* and at their ends nearest the said heart with portions *e'*, which are preferably inclined with respect to the lead proper and approach nearest the said lead at their ends next the heart. In such preferred construction, as shown, the ends of portions *e'* lap alongside the hooks *e* to about the points thereof, an opening or space E' being provided between the ends of parts *e'* and *e*, through which fish may enter the space or way between the guards and lead proper. At its outer end or end farthest from the pound or pot the lead is formed into a hook *a*, such hook being projected to the side on which the guards are arranged, and being like the hooks of said guards arranged to face or open toward the pot, so as to retard the movement of fish away from said pot and yet permit them to move freely toward the pot, as is desired.

Now in operation it will be seen if a fish meets the lead either at its outer end or by passing through one of the openings E', it is entrapped from that instant, as, if he drifts back away from the lead after following it a short distance he will strike one of the guards, and, following such guard, he will pass either to the next guard nearest the heart or to the lead, and so on until he is in the heart, and thence to the pot, whence he may be removed in any suitable manner. While it is greatly preferred to lap the sections E at one end past the end of the adjacent section, it will be understood that the sections may be arranged not to lap without departing from some of the broad principles of our invention.

Having thus described our invention, what we claim as new is—

The improved net, substantially as herein described, comprising the pot or pound, the lead extended therefrom and provided at its outer end with a hook *a*, and the series of guard-sections arranged alongside the lead and having their adjacent ends slightly separated and lapped past each other and provided at their ends farthest from the pot or pound with hooks projected toward the lead, the latter hooks and the hook *a* of the lead being arranged to open toward the pot or pound, all substantially as and for the purposes set forth.

GEORGE WILLIAMS.
ALBERT A. CLEVELAND.

Witnesses:
C. A. CAMPBELL,
C. J. CURTIS.